United States Patent [19]

Fujiwara et al.

[11] Patent Number: 4,463,042
[45] Date of Patent: Jul. 31, 1984

[54] CARTRIDGE

[75] Inventors: Hirotomo Fujiwara; Yoshio Hara, both of Kanagawa, Japan

[73] Assignee: Fuji Photo Film Co., Ltd., Kanagawa, Japan

[21] Appl. No.: 389,184

[22] Filed: Jun. 16, 1982

[30] Foreign Application Priority Data

Jun. 16, 1981 [JP] Japan .................................. 56-92560

[51] Int. Cl.$^3$ ........................ G09F 3/00; B65D 79/00; B32B 3/14
[52] U.S. Cl. ...................................... 428/35; 40/625; 428/78; 428/340; 428/409
[58] Field of Search .................. 428/78, 340, 409, 35; 523/149, 150; 524/32; 40/625-632

[56] References Cited

U.S. PATENT DOCUMENTS 3,051,670  8/1962  Grantham ............................. 524/32
3,346,521 10/1967  Fairbairn et al. ..................... 524/32
3,793,052  2/1974  Taylor .................................. 428/409
4,229,327 10/1980  Jacobone ............................. 524/32

Primary Examiner—William R. Dixon, Jr.
Attorney, Agent, or Firm—Sughrue, Mion, Zinn, Macpeak, and Seas

[57] ABSTRACT

A polymer plastic cartridge for holding an information recording means is disclosed. The cartridge is comprised of a container having a writing quality-imparting layer directly embedded on a surface of the container. The writing quality-imparting layer is comprised of a matting agent, a hydrophilic polymer, and a polymer of the same type which the container is comprised of. By embedding the writing quality-imparting layer on the surface of the container it is possible to easily write on the cartridge with a pen, pencil or other conventional writing means. The writing quality-imparting layer can be easily embedded on the surface of the container and will not easily peel off.

12 Claims, No Drawings

CARTRIDGE

FIELD OF THE INVENTION

The present invention relates to a plastic cartridge for holding information recording materials such as magnetic tape and photographic film. More particularly, the invention relates to such cartridges having a layer capable of being written on with a pencil, a fountain pen, or the like (hereinafter referred to as a writing quality-imparting surface) directly printed thereon.

BACKGROUND OF THE INVENTION

Cartridges for magnetic tape are commercially available under the name "cassette tapes". Cartridges for photographic film are also available on the market in various sizes, such as those for 8 mm cine film, as well as 110 and 126 sizes for pocket cameras. The user of the cassette tape or 8 mm cine film often wants to note what he has recorded, or what pictures he has taken, and thus needs to write such information on a writing surface on the cartridge. Conventionally, such a writing quality-imparting surface has been provided on the cartridge by preparing a paper label with the manufacturer's name, product name and other items printed thereon and attaching it to the cartridge with an adhesive. This method is, however, expensive since it involves two costly steps, i.e. printing a label and attaching it to the surface of the cartridge with an adhesive. Moreover, the paper label attached to the surface of a plastic cartridge does not always have aesthetic appeal and in an extreme case, it may be dislodged or peeled from the cartridge.

SUMMARY OF THE INVENTION

Therefore, one object of the present invention is to provide a cartridge having a writing quality-imparting surface made by an inexpensive method.

Another method of the invention is to provide a cartridge with a writing quality-imparting surface having aesthetic appeal and which is not easily dislodged.

Yet another object of the invention is to provide a cartridge with a writing quality-imparting surface in which letters can be written with all types of writing instruments and from which the letters so written are not easily erased.

These objects are achieved according to the present invention by means of a plastic cartridge having a writing quality-imparting layer directly printed on its surface.

DETAILED DESCRIPTION OF THE PREFERRED EMBODIMENT

Several methods are known for printing a writing quality-imparting layer directly onto the surface of a cartridge: intaglio offset printing known as "pad printing" using a suitably soft pad; ink jet printing; and bar coating. Of these methods, the "pad printing" is particularly suitable for directly printing fine lines or letters onto a cartridge which usually has an intricately raised surface.

Pad printing is one type of intaglio offset printing that uses a printing machine of the TAMPOPRINT TT series, TAMPORINT TS series or RTI series, commercially available from Tampoprint GmbH A.G., West Germany. In this method, the liquid on a printing plate is transferred onto a cup-shaped or cylindrical member, from which the liquid is further transferred onto the surface of a cartridge. The major advantage of pad printing is that since the pad is made of suitably flexible material, it closely follows the contour of the surface of the work and can transfer the liquid to the desired area by pressing it onto the work. Because of this feature, this method is capable of sharply printing fine letters or lines onto a cartridge having an intricately raised surface. The pad is usually made of silicone rubber or a cured gelatin membrane, and silicone rubber is used with particular advantage.

Devices for pad printing are also commercially available from Taihei Kogyo Co., Ltd., Japan, under the trade name of "Taihei Pad Printing Machine".

The liquid which is used to print a writing quality-imparting layer directly onto the surface of a cartridge by pad printing, ink jet printing or bar coating preferably comprises (1) a matting agent, (2) a hydrophilic polymer and (3) a polymer of the same type as that of the plastic material of which the cartridge is made.

A suitable matting agent is an inorganic particulate material having a size of 0.1 to 10$\mu$, such as fine particles of silicon dioxide (silica), calcium carbonate, magnesium cabonate, titanium dioxide and aluminum oxide. Fine particles of silicon oxide are preferred.

Suitable hydrophilic polymers include cellulose ether (methyl cellulose), polyvinyl alcohol and gelatin, and cellulose ether is preferred. Illustrative cellulose ethers include methyl cellulose, ethyl cellulose and carboxymethyl cellulose, and methyl cellulose is particularly preferred. The methyl cellulose resin preferably used in the present invention is such that about two of the three hydroxyl groups in one glycol residue in the cellulose are substituted by methoxy groups ($-OCH_3$). One wherein a very small portion of the so substituted methoxy groups is substituted by a hydropropoxy group ($-OC_3H_6OH$) is also included in the definition of the methyl cellulose resin. Such methyl cellulose resins are commercially available from Shinetsu Chemical Industry Co., Ltd. under the trade names "Metrose SM", "Metrose 60SH", "Metrose 65SH" and "Metrose 90SH".

Plastic cartridges are generally made of polystyrene resins, acrylic resins and vinyl chloride resins, and polystyrene resins, especially reinforced polystyrene resins, are used with particular advantage.

The polymer that is included in the liquid used for the present invention and which is of the same type as the material of which the cartridge is made is either the plastic as (e.g. polystyrene if the cartridge is made of polystyrene) or a polymer which easily bonds to that plastic and provides a smooth printing surface. A suitable polymer can be properly selected by those skilled in the art.

The above mentioned matting agent, hydrophilic polymer and polymer of the same type as the material of which the cartridge is made are dispersed in a suitable organic solvent to form a printing composition. Any organic solvent can be used if it forms a uniform dispersion of these components that is stable as a printing composition and which provides a strong bond between the writing quality-imparting surface and the surface of the cartridge and retains the desired area of writing-quality imparting surface. If the cartridge is made of a reinforced polystyrene resin, mixed solvents of (1) xylene, n-propanol and methylene chloride, (2) xylene, methanol and methylene chloride, and (3) xylene, ethanol and methylene chloride may be used. A mixed solvent of xylene, n-propanol and methylene chloride is preferred.

The matting agent is generally contained in the printing composition in an amount of from 0.5 to 5 g, preferably from 0.9 to 1.1 g, per 100 g of the liquid. The hydrophilic polymer is used in an amount of from 2 to 10 g, preferably from 3 to 5 g, per 100 g of the liquid. The polymer of the same type as the material of which the cartridge is made is used in an amount of from 0.1 to 2 g, preferably from 0.4 to 1 g, per 100 g of the liquid.

The ratio of the hydrophilic polymer (e.g. cellulose ether) to the polymer of the same type as the material of which the cartridge is made (e.g. polystyrene resin) is preferably from 10:1 to 10:2 by weight. If the proportion of the polystyrene resin is larger than the upper limit, the writing quality-imparting surface has only poor receptivity to writing ink, especially to aqueous ink. Furthermore, the two polymers are not uniformly dispersed in a mixed solvent. If the proportion of the polystyrene resin is smaller than the lower limit, the resulting composition does not have a strong bond to the surface of the cartridge, and the hardness of writing quality-imparting surface obtained is not large enough to withstand writing with a hard-lead pencil or ball-point pen.

If pad printing is used to print a writing quality-imparting composition onto the surface of the cartridge through a silicone rubber tampon or pad, an isocyanate resin, say polyurethane resin, is preferably included in the composition. The isocyanate resin such as polyurethane resin is used in an amount of from 1 to 5 g, preferably from 1.5 to 3 g, per 100 g of the composition.

The weight ratio of the matting agent to each of the polymers in the liquid is preferably from 10:1 to 10:2. If the proportion of the matting agent is larger than the upper limit, continuous printing with the liquid becomes difficult, and the writing quality-imparting surface becomes rough, develops cracks, and does not have a strong bond to the surface of the cartridge. If the proportion of the matting agent is smaller than the lower limit, the resulting writing quality-imparting surface is so soft that the hard nib of a ball-point pen or pencil intrudes into the writing quality-imparting surface to prevent smooth writing.

The weight ratio of the isocyanate resin to the mixture of the matting agent, hydrophilic polymer and polymer of the same type as the material of which the cartridge is made is preferably 10:1 and 10:3. If the proportion of the isocyanate is larger than the upper limit, the resulting mixture is not sufficiently miscible with an organic mixed solvent to form a satisfactory printing composition. If the proportion of the isocyanate resin is smaller than the lower limit, not much liquid is transferred to a silicone rubber tampon or pad, and the resulting writing quality-imparting surface is not suitable for writing with aqueous ink.

In the present invention, the liquid having the composition described above is generally applied onto the surface of the cartridge in an amount of 0.01 to 0.5 g, preferably from 0.02 to 0.05 g, for one surface, and dried to provide a writing quality-imparting surface.

Ordinally, the writing quality-imparting layer is applied by the pad printing method right after the items such as the manufacturer's name, and product name etc. are printed by other printing method. But it may be applied simultaneously or before printing such items. The hydrophilic polymer, matting agent or isocyanate resin may be omitted from the ink used for printing items (e.g. manufacturer's name, and product's name) other than the writing quality-imparting surface. The liquid used for printing a writing quality-imparting surface in the present invention may further contain a pigment such as titanium white.

The cartridge of the present invention has a writing quality-imparting layer (or writing quality-imparting surface) on at least one surface, which may be the front face, back surface or side face of the cartridge. If the cartridge with a writing layer of the present invention is used for a cassette tape, the use finds it very convenient since he can write on it any information, such as the recording date, what he recorded, whom he recorded, and under what conditions he made the recording. Since the cartridge of the present invention has the writing quality-imparting layer directly printed thereon, it can be manufactured at a lower cost than the conventional cartridge with a paper label. Furthermore, it has good aesthetic appeal and great durability. As a further advantage, if the liquid containing a hydrophilic polymer is used to print the writing quality-imparting surface, not only writing instruments using oil ink but also those using aqueous ink such as fountain-pens can be used to write necessary information on the writing quality-imparting surface.

The present invention is now described in more detail by reference to the following examples to which the invention is by no means limited.

EXAMPLE 1

A writing quality-imparting composition was printed onto one surface of a cartridge for a cassette tape made of reinforced polystyrene resin with a pad printing machine (intaglio silicone rubber offset printing machine) in an amount of 0.0016 g/m$^2$ (with respect to the amount of solids contained therein) and it was dried at room temperature to form a writing-quality imparting layer on the cartridge. The writing quality-imparting composition consisted of a mixture of solution A made up of a polystyrene resin (Himer ST95 of Sanyo Chemical Industries, Ltd.), a cellulose ether resin (Metrose 60SH of Shinetsu Chemical Industry Co., Ltd.), a matting agent (fine particles of silicon dioxide having an average size of 2μ) and a mixed solvent of xylene, n-propanol and methylene chloride (74.6 parts), and solution B made up of a polyurethane resin and methylene chloride. Three samples, that is, sample No. 1, sample No. 2, and sample No. 3 were prepared by varying the amounts of the polystyrene, cellulose ether and polyurethane as indicated in Table 1 below.

The samples were compared with each other concerning their writing performance as to various writing instruments, the quality of the writing surface and liquid transferability to silicone rubber, and the results are shown in Table 1. All samples had a writing quality-imparting layer directly printed thereto, so they could be produced at low cost and had good aesthetic appeal. Sample No. 1 using an liquid containing a polystyrene resin, cellulose ether, polyurethane and a matting agent proved the best of the three with respect to all the factors tested.

TABLE 1

| Sample No. | Solids in liquid (parts by weight) | | | | Writing performance | | | | Quality of writing surface | Transferability to silicone rubber |
|---|---|---|---|---|---|---|---|---|---|---|
| | Polystyrene | Cellulose ether | Polyurethane | Matting agent | Fountain Pen with Aqueous Ink | Marking Pen with Oil ink | Ball point pen | Pencil | | |
| 1 | 0.6 | 4 | 1.8 | 1 | O | O | O | O | O | O |
| 2 | 0.6 | 4 | — | 1 | Δ | O | O | O | O | X |
| 3 | 0.6 | — | 1.8 | 1 | X | O | O | O | O | O |

O . . . good
Δ . . . fair
X . . . poor

EXAMPLE 2

Three writing quality-imparting composition (sample Nos. 1 to 3 employed in Example 1) were printed on one surface of a polystyrene cartridge by bar coating. They were dried at room temperature to form writing quality-imparting layers (Sample Nos. 4 to 6).
Sample No. 4 was formed by liquid of Sample No. 1,
Sample No. 5, was formed by liquid of Sample No. 2, and
Sample No. 6, was formed by liquid of Sample No. 3.
The samples were compared with each other for their writing performance. The results are shown in Table 2 below, from which one can see that all samples were satisfactory except that Sample No. 6 was not suitable for writing with aqueous ink.

TABLE 2

| Sample No. | liquid | Writing Performance | | | | Quality of writing surface |
|---|---|---|---|---|---|---|
| | | Fountain Pen with Aqueous ink | Marking Pen with Oil ink | Ball point Pen | Pencil | |
| 4 | same as Sample No. 1 | O | O | O | O | O |
| 5 | same as Sample No. 2 | O | O | O | O | O |
| 6 | same as Sample No. 3 | X | O | O | O | O |

What is claimed is:

1. A polymer plastic cartridge for holding an information recording means, comprising:
   a polymer plastic container; and
   a writing quality-imparting layer embedded on a surface of the container, wherein the writing quality-imparting layer is formed from a liquid printing composition comprising a, filler material having a size of 0.1 to 10μ in an amount of 0.5 to 5 grams per 100 grams of the liquid composition, a hydrophilic polymer selected from the group consisting of cellulose ether, polyvinyl alcohol and gelatine and present in an amount of from 2 to 10 grams per 100 grams of the liquid composition, and a polymer plastic of the same type of which the container is comprised and present in an amount of from 0.1 to 2 grams per 100 grams of the liquid compostion.

2. A polymer plastic cartridge for holding an information recording means, as claimed in claim 1 wherein the filler material and polymers are present in the liquid composition in ratios of from 10:1 to 10:2.

3. A polymer plastic cartridge for holding an information recording means, as claimed in claim 2, wherein the composition is applied to the surface of the container in an amount of 0.01 to 0.5 grams.

4. A polymer plastic cartridge for holding an information recording means as claimed in claim 3, wherein the hydrophilic polymer is cellulose ether and the polymer plastic of the same type of which the container is comprised is a polystyrene resin.

5. A polymer plastic cartridge for holding an information recording means, as claimed in claim 3, wherein the cartridge is a cassette for a magnetic recording tape.

6. A polymer plastic cartridge for holding an information recording means as claimed in claim 3, wherein the cartridge is a cartridge for an 8 mm cine film.

7. A polymer plastic cartridge for holding an information recording means as claimed in claim 3, wherein the writing quality-imparting layer is formed on the container by an intaglio offset printing method.

8. A polymer plastic cartridge for holding an information recording means as claimed in claim 7, wherein said offset printing method utilizes a silicone rubber tampon.

9. A polymer plastic cartridge for holding an information recording means as claimed in claim 7, wherein the off set printing method utilizes a silicone rubber pad.

10. A polymer plastic cartridge for holding an information recording means as claimed in claim 3, wherein the hydrophilic polymer is cellulose ether.

11. A polymer plastic cartridge for holding an information recording means as claimed in claim 3, wherein the polymer plastic of the container is a polystyrene resin.

12. A polymer plastic cartridge for holding an information recording means as claimed in claim 3, wherein the liquid composition is further comprised of a polyurethane resin.

* * * * *